United States Patent
Semary

(10) Patent No.: US 11,820,888 B1
(45) Date of Patent: Nov. 21, 2023

(54) ALGAE-BASED PLASTIC

(71) Applicant: KING FAISAL UNIVERSITY, Al-Ahsa (SA)

(72) Inventor: Nermin Adel El Semary, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/216,355

(22) Filed: Jun. 29, 2023

Related U.S. Application Data

(62) Division of application No. 18/124,767, filed on Mar. 22, 2023.

(51) Int. Cl.
*C08L 5/00* (2006.01)

(52) U.S. Cl.
CPC .............. *C08L 5/00* (2013.01); *C08L 2201/06* (2013.01)

(58) Field of Classification Search
None
See application file for complete search history.

(56) References Cited

U.S. PATENT DOCUMENTS

| | | | |
|---|---|---|---|
| 2012/0308797 A1 | 12/2012 | Mahan et al. | |
| 2013/0344550 A1* | 12/2013 | Miller | C12P 7/625 435/253.6 |
| 2022/0162424 A1* | 5/2022 | Dundar Field | A23L 29/256 |
| 2022/0251390 A1* | 8/2022 | Mulyono | C08L 99/00 |

FOREIGN PATENT DOCUMENTS

| | | | | |
|---|---|---|---|---|
| CN | 113549236 B | * | 12/2021 | |
| WO | 2012054003 A1 | | 4/2012 | |
| WO | WO-2012054003 A1 | * | 4/2012 | ............. C08L 23/02 |
| WO | WO-2016090511 A1 | * | 6/2016 | ............. B32B 27/00 |

OTHER PUBLICATIONS

WO-2012054003-A1—English translation (Year: 2012).*
WO-2016090511-A1—English translation (Year: 2016).*
CN-113549236-B—English translation (Year: 2021).*
Wen YiChia et al., "Nature's fight against plastic pollution: Algae for plastic biodegradation and bioplastics production", Environmental Science and Ecotechnology, vol. 4, Oct. 2020.
Steven, et al., "Facile Preparation of Cellulose Bioplastic from *Cladophora* sp. Algae via Hydrogel Method", Polymers 2022.
Magloff, "Smart Bioplastic Made Using Upcycled Green Algae Helps to Clean up Beaches", Oct. 22, 2021.
Clancy, "This edible packaging will make you reconsider seaweed", Greenbiz.com, Nov. 1, 2017.
Bolskis, et al., "Influence of Myrrh Extracts on the Properties of PLA Films and Melt-Spun Multifilament Yarns", Materials 2020.

* cited by examiner

*Primary Examiner* — Stefanie J Cohen
(74) *Attorney, Agent, or Firm* — Nath, Goldberg & Meyer; Richard C. Litman

(57) ABSTRACT

The present processes are used to convert green algae into a moldable bioplastic. Specifically, the present processes use a green alga such as *Cladophora* sp. Combined with myrrh to obtain the moldable bioplastic. Once obtained, the moldable bioplastic can form a composite, optionally with other environmentally friendly materials, to obtain eco-friendly products, such as a biodegradable and sustainable container such as a bag.

3 Claims, No Drawings

ALGAE-BASED PLASTIC

CROSS-REFERENCE TO RELATED APPLICATION

This application is a divisional of U.S. patent application Ser. No. 18/124,767, filed on Mar. 22, 2023.

BACKGROUND

1. Field

The disclosure of the present patent application relates to algae-based plastics or bioplastics, and particularly to algae-based plastics derived from marine green algae.

2. Description of the Related Art

Plastics are used in many industries. The vast majority of traditional chemical plastics are non-biodegradable and they pollute our environment, unlike plant-based plastics that are biodegradable and maintain environmental sustainability. Production from nonrenewable resources and their resistance to biodegradation are issues that deter us from relying on conventional petrochemical-based plastics. In this context, bioplastics, or plant-based plastics, derived from natural sources are emerging as sustainable and safe alternatives. Bioplastics are increasingly relied upon for their pro-environment aspects. However, much more work needs to be done to develop suitable plant-based bioplastics that can be used as complete chemical plastic replacements.

Therefore, researchers have recently focused on novel and potentially eco-friendly control tools. Algae are a group of photosynthetic organisms which inhabit a wide range of environments and are plentifully available. The development of plant-based bioplastics produced from algae represent potentially safe, applicable, and low-cost alternatives for traditional chemical plastics, which negatively affect the environment and health.

Thus, new bioplastics derived from algae solving the aforementioned problems are desired.

SUMMARY

In certain embodiments, the present subject matter relates to new bioplastics derived from algae, particularly green algae, processes for obtaining the same, and eco-friendly containers implementing the same.

In one embodiment, the present subject matter relates to a process for preparing a moldable bioplastic, the process comprising: mixing an air-dried algal biomass of green algae with ground myrrh in a solvent to obtain a mixture; heating the mixture to obtain a heated mixture; homogenizing the heated mixture to obtain a homogenized heated mixture; mixing the heated mixture with additional solvent to form a homogenous thick film; and forming the moldable bioplastic from the homogenous thick film. This last step can be done by air drying the homogenous thick film. In another embodiment, the present subject matter relates to a process for preparing a moldable bioplastic, the process comprising: mixing an air-dried algal biomass of green algae with ground myrrh in a solvent along with glycerin (50%) to obtain a mixture; homogenizing the mixture; and air drying the homogenized mixture to form the moldable bioplastic.

In an additional embodiment, the present subject matter relates to a moldable bioplastic produced according to the processes described herein.

In a further embodiment, the present subject matter relates to a composition comprising a composite of the heated moldable bioplastic described herein and one or more optional additional components, such as, by way of non-limiting example, glycerin. In other embodiments, the present subject matter relates to an environmentally neutral container comprising this composition.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter relates to a process for preparing a moldable bioplastic, the process comprising: mixing a dry algal biomass of a green algae with ground myrrh in a solvent to obtain a mixture; heating the mixture to obtain a heated mixture; homogenizing the heated mixture to obtain a homogenized heated mixture; mixing the heated mixture with additional solvent to form a homogenous thick film; and forming the moldable or shapable bioplastic from the homogenous thick film. This last step can be done by air drying the homogenous thick film.

In one embodiment, the green algae used in the present process is marine *Cladophora* sp. of the genus *Cladophora*. *Cladophora* sp. is a filamentous branching alga that may grow in marine or freshwater environments, where the composition largely depends on the environment from which the algae biomass is collected or the algae cultivation conditions, and season. In another embodiment in this regard, the *Cladophora* sp. algae biomass and the myrrh are mixed in an about 2:1 ratio, by weight.

In further embodiments, the marine green algae used in the process can comprise one or more carbohydrates, one or more lipids, one or more minerals, one or more vitamins, and one or more proteins. In this regard, the one or more carbohydrates can be selected from the group consisting of sugar, cellulose, polysaccharides, and combinations thereof. Similarly, the one or more polysaccharides can consist of ulvan, the sugar can consist of psicose, and the cellulose can be crystalline. Additionally, the one or more lipids can be selected from the group consisting of glycerols, saturated and unsaturated fatty acids, phospholipids, glicolipids, and combinations thereof, and the one or more vitamins can be selected from the group consisting of vitamins A, B1, B2, C, and E and combinations thereof.

In certain embodiments, the solvent used to obtain the mixture can be water. In another embodiment, the additional solvent can be water. In further embodiments, the mixture can be heated at a temperature of about 95° C. to about 105° C., about 95° C., about 96° C., about 97° C., about 98° C., about 99° C., about 100° C., about 101° C., about 102° C., about 103° C., about 104° C., or about 105° C. In one embodiment in this regard, the mixture can be heated at a temperature of about 100° C. In this regard, the heating step can be conducted by a normal heating process or by autoclaving the mixture.

In another embodiment, the mixture does not require heating. According to this embodiment, the present process for preparing a moldable bioplastic comprises: mixing an air-dried algal biomass of green algae with ground myrrh in a solvent along with glycerin (50%) to obtain a mixture; homogenizing the mixture; and air drying the homogenized mixture to form the moldable bioplastic In certain embodiments, the present subject matter relates to a moldable bioplastic prepared by the processes described herein. In this regard, *Cladophora* sp. is known as a green alga. As such, it is expected that the *Cladophora* sp.-based biopplastic as prepared herein will include components including, by way of non-limiting example, one or more carbohydrates selected from the group consisting of sugar, cellulose, polysaccharides, and combinations thereof; one or more polysaccharides selected from the group consisting of ulvan; cellulose that is crystalline; sugar consisting of psicose; one or more lipids selected from the group consisting of glycerols, saturated and unsaturated fatty acids, phospholipids, glicolipids, and combinations thereof; one or more minerals; one or more proteins; and one or more vitamins selected from the group consisting of vitamins A, B1, B2, C, and E and combinations thereof.

In further embodiments in this regard, the concentration of each of these bioactive compounds in the produced algae extract can vary according to the age of the algae, metabolic activity, and ecological adaptation.

In additional embodiments, the components and quality of the bioplastics can vary and be adjusted according to the desired purpose of use of the bioplastic. The bioplastic can be prepared as a thick or thin biomaterial according to the specification intended use. What is most important, regardless of the use of the bioplastic, is that the about 2:1 weight ratio of the *Cladophora* sp. and the myrrh be maintained; the actual amounts or concentrations of each component can be adjusted according to the desired use of the biopolymer.

In one embodiment, the present subject matter further relates to a composition comprising a composite of the moldable bioplastic as described herein and one or more additional components that can optionally include, by way of non-limiting example, glycerin. The thus produced composition can be moldable and easily shaped.

In further embodiments, the present subject matter relates to an environmentally neutral container comprising the herein described composition. Said neutral container can be shaped into, for example, the form of small containers or bags that can act as alternatives to conventional chemical plastic containers or bags. As such, the container can be biodegradable and maintain environmental sustainability. Additionally, marine alga may be used to both reduce contamination with phosphorus and eutrophication, along with use of its biomass in making biodegradable plastic that can be used in agriculture and can biocompost land.

EXAMPLES

Example 1

6 gm of dry algal biomass is thoroughly mixed with 3 gm ground myrrh together in 75 ml water. The mixture is then autoclaved or heated at about 100 C. The resultant autoclaved mixture is further mixed in 25 ml of water until a homogenous thick film is produced. Glycerin 50% may or may not be added. The mixture is left to dry to form a cohesive algae-based plastic biocomposite or bioplastic.

Example 2

6 gm of dry algal biomass is mixed with ground myrrh, glycerin (50%) and water and left to dry to form a cohesive algae-based plastic biocomposite or bioplastic.

It is to be understood that the bioplastics are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A process for preparing a moldable bioplastic, the process comprising:

mixing an air-dried algal biomass of green algae with ground myrrh in a solvent and glycerin (50%) to obtain a mixture;

homogenizing the mixture to obtain a homogenized mixture; and air drying the homogenized mixture to form the moldable bioplastic;

wherein the green algae is *Cladophora* sp. and the *Cladophora* sp. and the myrrh are mixed in a 2:1 ratio, by weight, respectively.

2. The process as recited in claim 1, wherein the solvent is water.

3. The process as recited in claim 1, wherein the green algae comprises one or more carbohydrates selected from the group consisting of sugar, cellulose and polysaccharides; one or more lipids selected from the group consisting of glycerols, saturated and unsaturated fatty acids, phospholipids and glicolipids; one or more minerals, one or more vitamins selected from the group consisting of vitamins A, B1, B2, C, and E, and one or more proteins; and wherein the one or more polysaccharide is ulvan, the cellulose is crystalline; and the sugar is psicose.

\* \* \* \* \*